(12) United States Patent
Kim et al.

(10) Patent No.: US 7,039,625 B2
(45) Date of Patent: May 2, 2006

(54) INTERNATIONAL INFORMATION SEARCH AND DELIVERY SYSTEM PROVIDING SEARCH RESULTS PERSONALIZED TO A PARTICULAR NATURAL LANGUAGE

(75) Inventors: Moom Ju Kim, Wappingers Falls, NY (US); Mariao Nishikora, Tokyo (JP); Bni Takamura, Tokyo (JP); Atsushi Taura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/302,108

(22) Filed: Nov. 22, 2002

(65) Prior Publication Data

US 2004/0103075 A1    May 27, 2004

(51) Int. Cl.
*G06F 17/30*    (2006.01)
(52) U.S. Cl. ................ 707/1; 707/100; 704/2
(58) Field of Classification Search .......... 707/1, 707/3, 100; 704/2, 8
See application file for complete search history.

(56) References Cited

U.S. PATENT DOCUMENTS

| | | | |
|---|---|---|---|
| 6,005,860 A | 12/1999 | Anderson et al. | 370/352 |
| 6,111,572 A | 8/2000 | Blair et al. | 345/333 |
| 6,141,005 A | 10/2000 | Hetherington et al. | 345/333 |
| 6,262,725 B1 | 7/2001 | Hetherington et al. | 345/333 |
| 6,275,810 B1 | 8/2001 | Hetherington et al. | 705/9 |
| 2003/0149686 A1* | 8/2003 | Drissi et al. | 707/3 |
| 2003/0149687 A1* | 8/2003 | Brown et al. | 707/3 |
| 2004/0044669 A1* | 3/2004 | Brown et al. | 707/100 |

OTHER PUBLICATIONS

W. Cheung +C. Hsu, "The Model-Assisted Global Query System for Multiple Databases in Distributed Enterprises" Oct. 1996, vol. 14 No. 4 pp. 421-470—ACM Transactions Info. Sys.

Research Disclosure, Feb. 2002, p. 276, #454112 "The Nexus—a unique way to allow the sharing of objects in multiple application spaces".

* cited by examiner

*Primary Examiner*—Jeffrey Gaffin
*Assistant Examiner*—Hassan Mahmoudi
(74) *Attorney, Agent, or Firm*—Norman Gundel

(57) ABSTRACT

Documents containing information about product offerings in various natural languages are passed through transitional translation layers which convert the data to a single computer language using a universal character set encompassing the character sets used in all supported natural languages. The documents are stored in their original natural languages and in English with documents segmented into components which components are identified by search terms arranged in a taxonomy tree based on product types. The names of the products in the national languages are added to the English language documents enabling quick keyword searches when the product name or number is known. A bi-directional inverted index is provided for access by the keyword search terms so that keywords with the same meaning in different languages are accessible together when the keyword in one of the languages is queried.

15 Claims, 14 Drawing Sheets

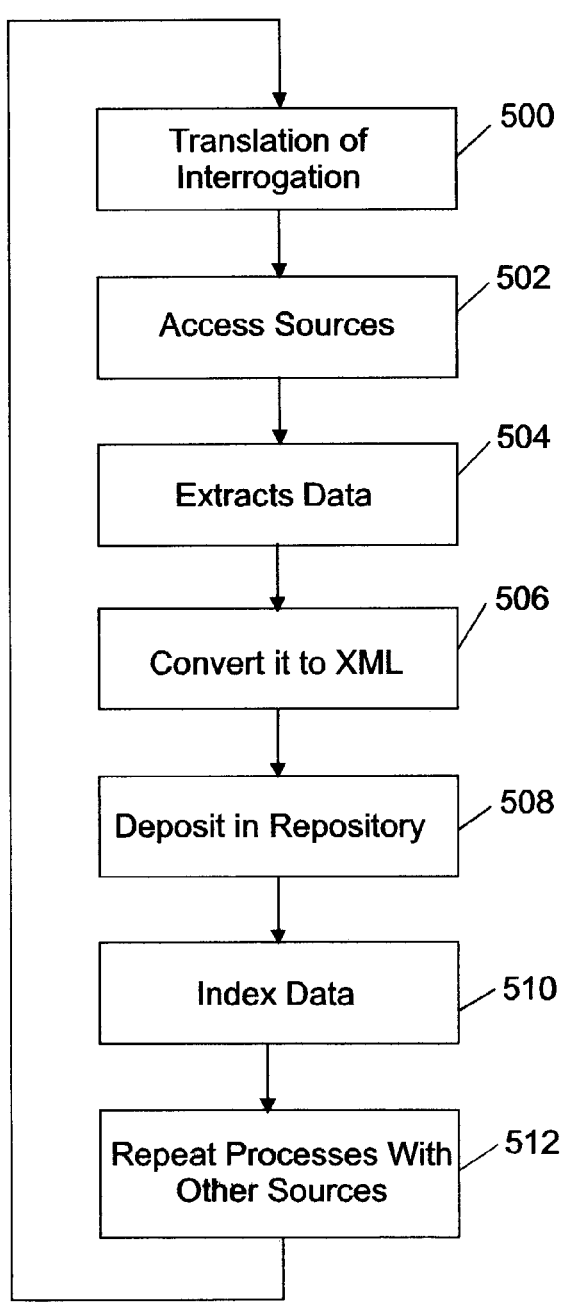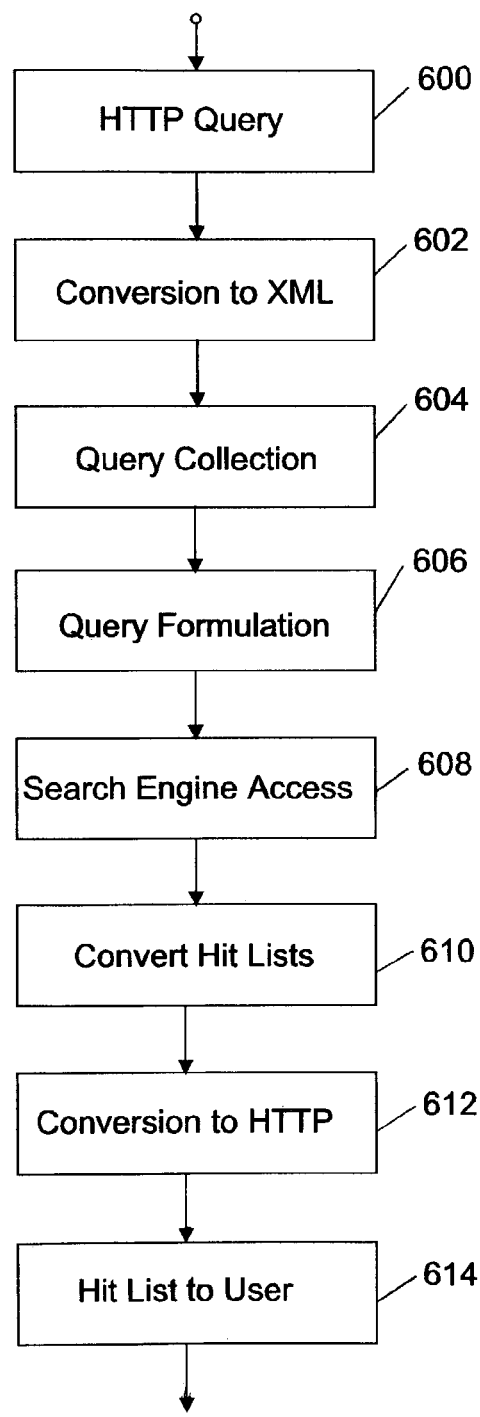

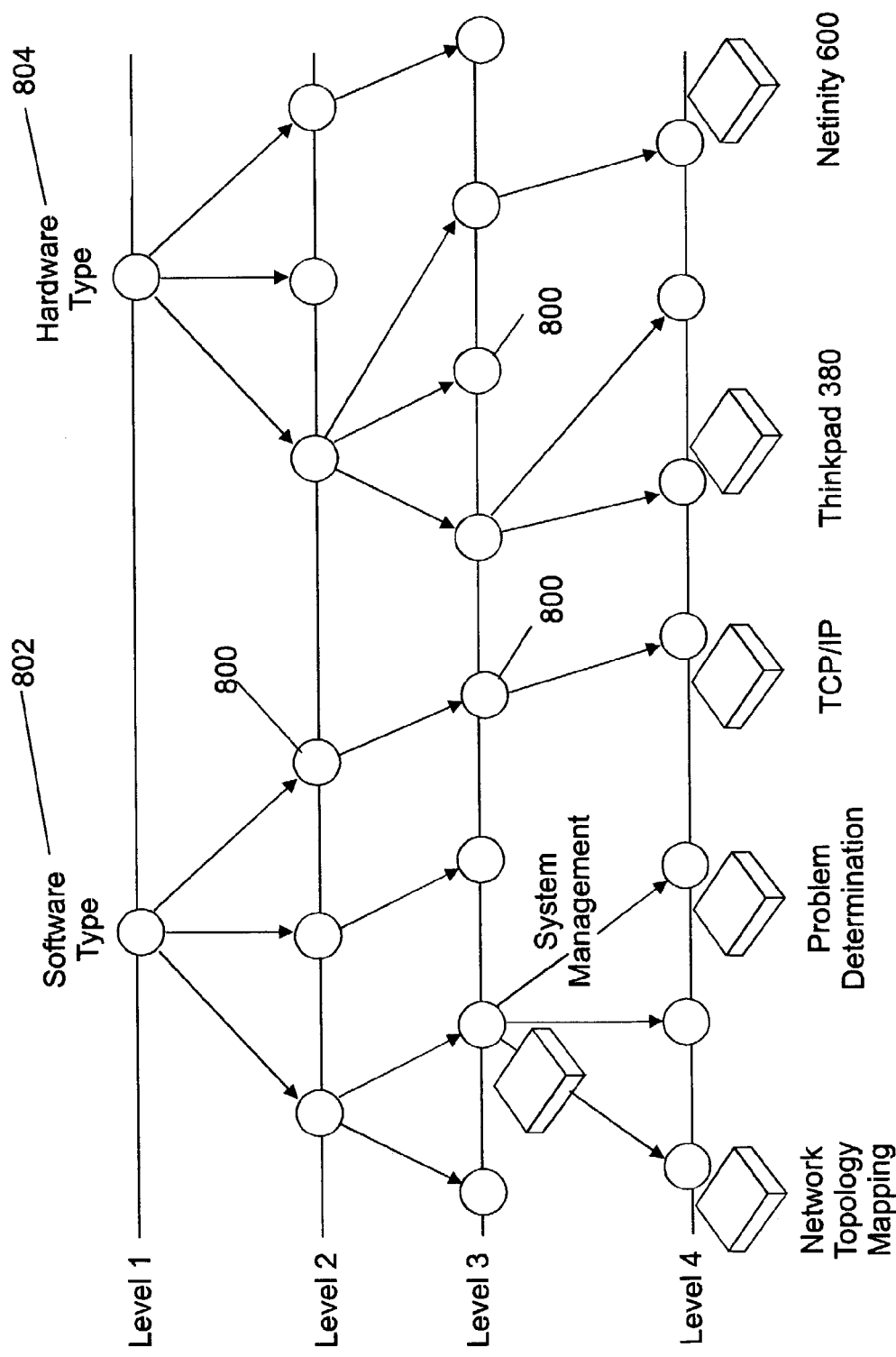

FIG. 10

|  | $D_1$ | $D_2$ | ... | $D_i$ | ... | $D_n$ |
|---|---|---|---|---|---|---|
| Eng.→$K_1$ | X |  |  | X |  |  |
| NL1→$K_{11}$ | X |  |  | X |  |  |
| NL2→$K_{12}$ | X |  |  | X |  |  |
| ... |  |  |  |  |  |  |
| Eng.→$K_1$ |  | X |  |  |  | X |
| NL1→$K_{11}$ |  | X |  | X |  | X |
| NL2→$K_{12}$ |  | X |  | X |  | X |
| ... |  |  |  |  |  |  |
| Eng.→$K_1$ |  | X |  | X |  | X |
| NL1→$K_{11}$ |  | X |  |  |  | X |
| NL2→$K_{12}$ |  | X |  | X |  | X |

| | | |
|---|---|---|
| Search Term | Laptop + IBM + .... | 1200 |
| Search Area | Any Country | 1202 |
| Search Language | All | 1204 |
| Query Language | English | 1206 |
| Result | German | 1208 |

INTERNATIONAL INFORMATION SEARCH AND DELIVERY SYSTEM PROVIDING SEARCH RESULTS PERSONALIZED TO A PARTICULAR NATURAL LANGUAGE

RELATED APPLICATIONS

The contents of the following listed applications are hereby incorporated by reference:

(1) U.S. patent application Ser. No. 10/157,243, filed on May 30, 2002 and entitled "Method and Apparatus for Providing Multiple Views of Virtual Documents."

(2) U.S. patent application Ser. No. 10/159,373, filed on Jun. 3, 2002 and entitled "A System and Method for Generating and Retrieving Different Document Layouts from a Given Content."

(3) U.S. patent application Ser. No. 10/180,195, filed on Jun. 27, 2002 and entitled "Retrieving Matching Documents by Queries in Any National Language."

(4) U.S. patent application, (YOR920020141), filed on Jul. 23, 2002 and entitled "Method of Search Optimization Based on Generation of Context Focused Queries."

(5) U.S. patent application Ser. No. 10/209,619 filed on Jul. 31, 2002 and entitled "A Method of Query Routing Optimization."

(6) U.S. patent application Ser. No. 10/066,346 filed on Feb. 1, 2002 and entitled "Method and System for Searching a Multi-Lingual Database."

(7) U.S. patent application Ser. No. 10/229,552 filed on Aug. 28, 2002 and entitled "Universal Search Management Over One or More Networks."

FIELD OF THE INVENTION

The present invention relates to the configuration of multi-language database networks. Further, the present invention relates to performing keyword searches and obtaining search results in selected languages on database networks.

BACKGROUND OF THE INVENTION

Internet text retrieval systems accept a statement for requested information in terms of a search query S made up of a plurality of keywords $T_1, T_2, \ldots T_i, \ldots T_n$ and return a list of documents that contain matches for the search query terms. To facilitate the performance of such searches on internet databases, search engines have been developed that provide a query interface to the information containing sources and return search results ranked sequentially on how well the listed documents match the search query. One of the uses of search engines is in connection with company web sites. One problem with company web sites is that it is difficult for customers and employees alike to find the information that they need. This is particularly true in certain product support databases which can be heavily weighted with pages with technical content. In a corporation with global reach, this information can be in a number of natural languages, both analog and digital form, and in a number of different formats, and in multiple machine languages. The type of data and their form, format, and languages may not be what is required or even understood by the searcher. What is necessary is an internationalized searching system which is easy to use and provides results that can be understood by the searcher.

Therefore it is an object of the present invention to provide an internationalized searching system accessible in multiple languages and providing comprehensible search results in selectable languages.

It is further an object of the present invention to provide an internationalized searching system capable of accessing information in numerous forms, formats and languages which is capable of providing the information to searchers in their desired formats and computer languages.

It is another object of the present invention to provide an internationalized searching system that accepts search terms in multiple national languages and provides locale specific search results.

BRIEF DESCRIPTION OF THE INVENTION

In accordance with the present invention, inputted data in various natural languages are passed through transitional translation layers which convert the data to a single computer language using a universal character set encompassing the character sets used in all supported natural languages. The data are stored in their original natural languages with documents segmented into components identified by search terms which components are arranged in a taxonomy tree based on types. In the case of a product database, these types could be various product types enabling quick keyword searches when the product name or number is known. A bi-directional inverted index is provided for access by the keyword search terms in which the keywords in all supported languages are stored and cross-referenced to documents in each of the natural languages. Keywords with the same meaning in different languages are accessible together when the keyword in one of the languages is queried. The search engine containing the table can identify pertinent documents either in the queried language, a second language or in all supported languages as determined by the user. Documents in selected languages are formulated from the stored segments and identified when requested by the searcher. The operated on documents are then outputted through transitional translation layers and provided in the desired format the same or different from the input form and language.

BRIEF DESCRIPTION OF THE DRAWINGS

FIG. 5 is a schematic flow diagram showing back-end data collection in accordance with the present invention;

FIG. 6 is a schematic flow diagram of the handling of a keyword query in accordance with the present invention;

FIG. 8A is a schematic diagram showing the arrangement of data in a taxonomy tree relating to product types:

FIG. 10 is a diagram of an index table associating keywords in one language with their counterparts in another language;

FIG. 12 is a diagram of a portion of computer display screen to enter search queries;

DETAILED DESCRIPTION OF THE INVENTION

Figure 1:
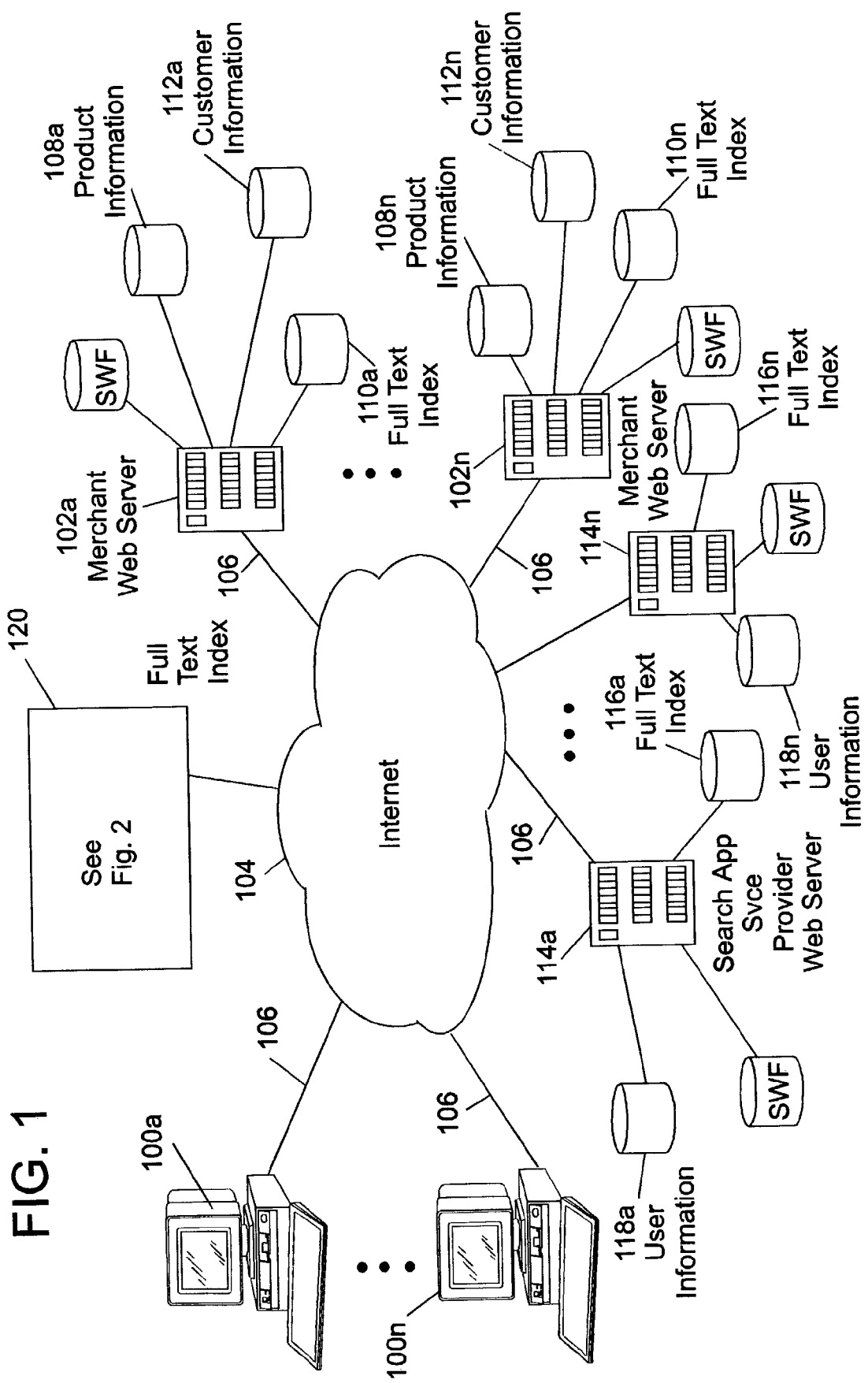
FIG. 1 is a schematic diagram for system organization of an on-line area network.

Referring now to FIG. 1, communication between a plurality of user computers 100a to 100n and a plurality of information servers 102a to 102n is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants which, for a fee provide products, services and information over the Internet. While the following discussion is directed at communication between shoppers and such merchants over the Internet, it is generally applicable to any information seeker and any information provider on a network. (For instance, the information provider can be a library such as a University library, a public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which providers maintain full text indexes 116 of the products of the individual merchants 102a to 102n obtained by interrogating the product information databases 108 of the individual merchants. Some of these search service providers, like Google, are general purpose search providers while others are topic specific search providers.

The merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, occupation, address, hobbies) regarding the shopper as provided by the shopper when subscribing to the service or obtained from other sources. Profile data can help in discerning the meaning of words used in a keyword query. For instance, a keyword in the query of a medical doctor could have an entirely different meaning to the use of the same keyword presented by a civil engineer. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain basic test ranking Tf (including the number of hits, their location, etc. which are used to order the list of documents) with documents with higher scores at the top. This list is then sent to a ranking module which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

Figure 2:
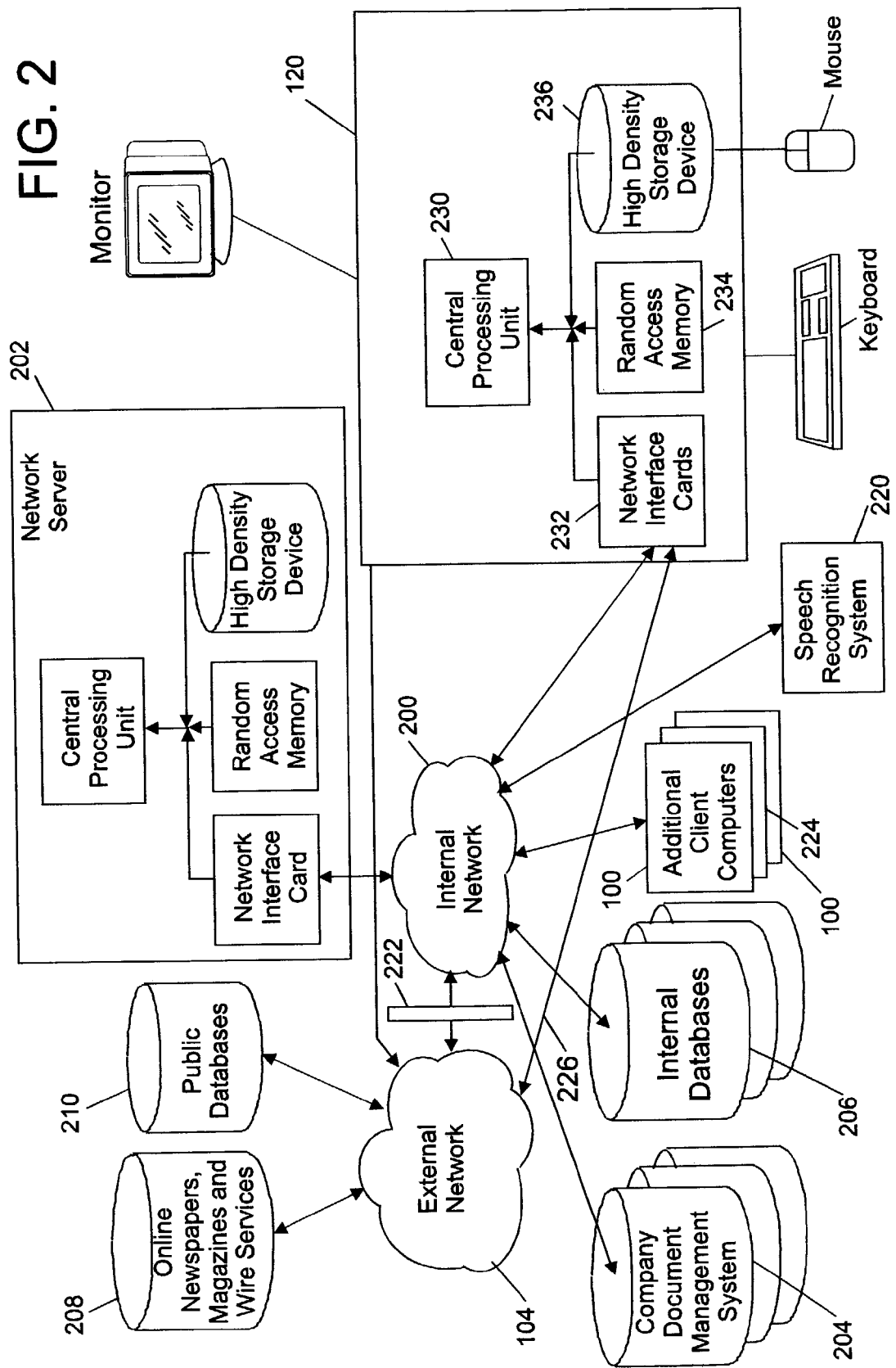
FIG. 2 is a schematic diagram of a private network incorporating the present invention and connected to the network shown in FIG. 1.

FIG. 1 shows how a multi-language internet search management server 120, in accordance with the present invention, can be used as one of the merchants web server 120 obtain information from the merchant and supply it to a user. As shown in FIG. 2, the search management server 120 is connected in a private intranet network 200 with a server 202 and a number of computers 100, such as those described in FIG. 1, so that the computers 100 can obtain information stored in the internal sources of the private intranet. The intranet 200 is provided with public internet access capability which provides access to services on the public internet 104. A "firewall" 222 separates the public internet 104 from the private intranet 200 allowing only those with the proper ID and password to enter the intranet 200 from the public internet 104. Internal sources of the intranet 200 are company document management systems 204, and internal databases 206. Also, intranet 200 is provided with a speech recognition system 220 capable of responding to compressed digitized data of voice commands and voice dictation provided by the client computers 100 either from an individual computer 100 or a client's network of such computers.

Figure 3:
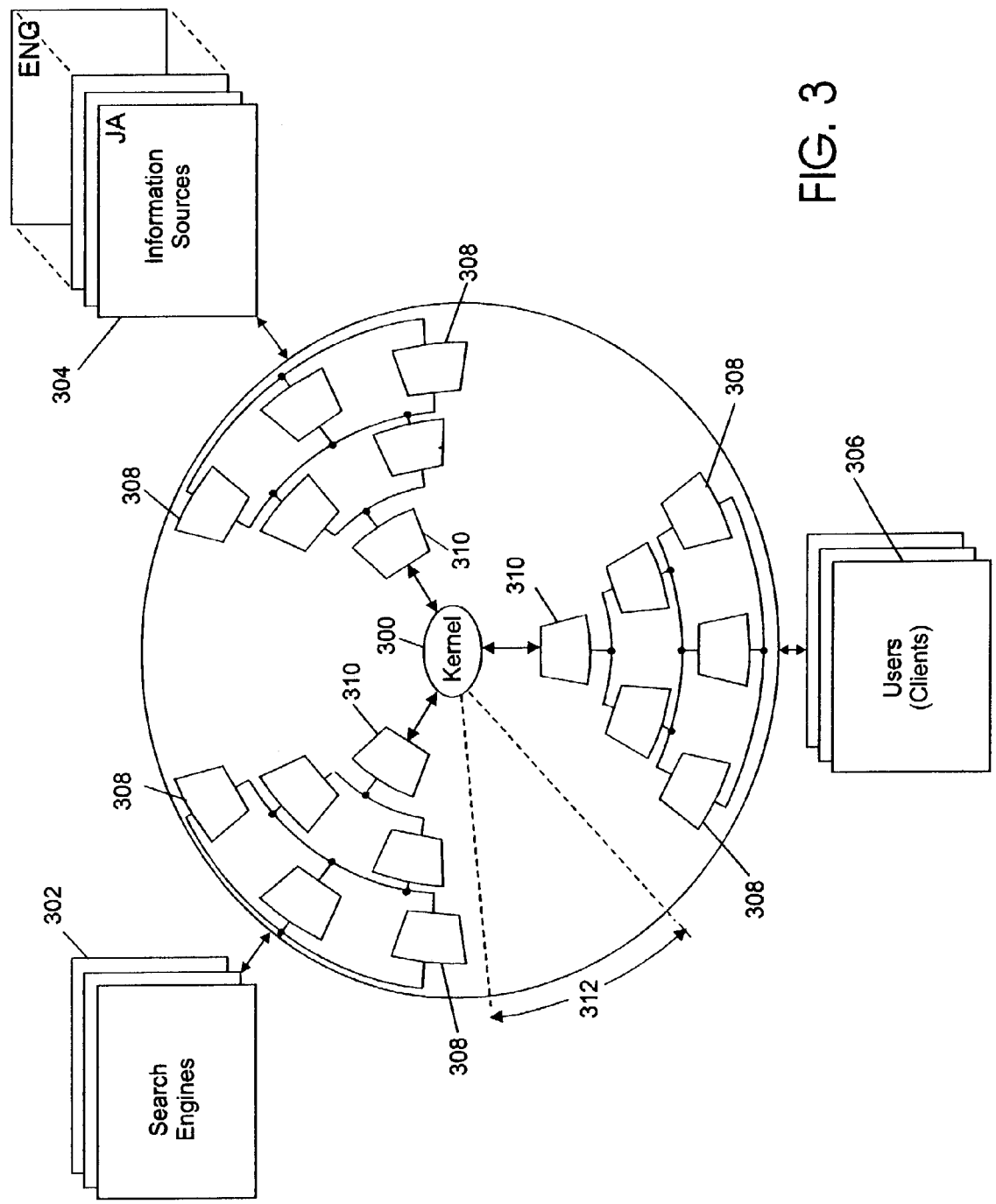
FIG. 3 is a schematic diagram showing the arrangement of information sources, search engines in connection with the translation layers and information kernel of the present invention.

In accordance with the present invention, the search management server 120 contains an integrated search management system, shown in FIG. 3, which receives queries and information from search engines both in the intranet and internet and accesses information sources other than those that are in the intranet and internet through the computers 100. For example, voice messages transmitted to computer 224 and connected to text by a speech recognition system 220 can be stored in the integrated search management system. The integrated management server contains a central processing unit 230, network interfaces 232 and sufficient random access memory 234 and high density storage 236 to perform its functions. In addition to its connection to the intranet, the search management system contains a direct link 226 to the internet to enable access by customers of the merchant.

As shown in FIG. 3, the integrated search management system has a core or kernel 300 that operates only on data and code in extended markup language (XML) form, with characters coded in the Universal Unicode Character set. Data from all possible sources in all supported natural languages are reduced to this common form before entering the integrated search management system. For instance, HTML pages, text files, and the mentioned voice messages, are converted to common form. Data in the various source forms of the search engines 302, the information sources 304 and user machines 306 are converted to the XML kernel form in a series of shells containing translators in which the various documents are converted from their source forms to the XML form in the interior translators. The translators 308 are arranged in layers so that they can be shared in the translations between the source languages and the kernel language. When a new source layer is to be added, an additional layer can be provided to translate between the new or modified source language and an existing source language. If an entirely new protocol is to be accommodated, an additional segment 312 of translators 308 and 310 can be added. This provides a search management system with evolving technology with modular use of object oriented program modulars for the translation units 308 and 310. As shown, the information sources 304 can be in any supported natural language. The data retains its natural language status throughout its processing.

Figure 4:
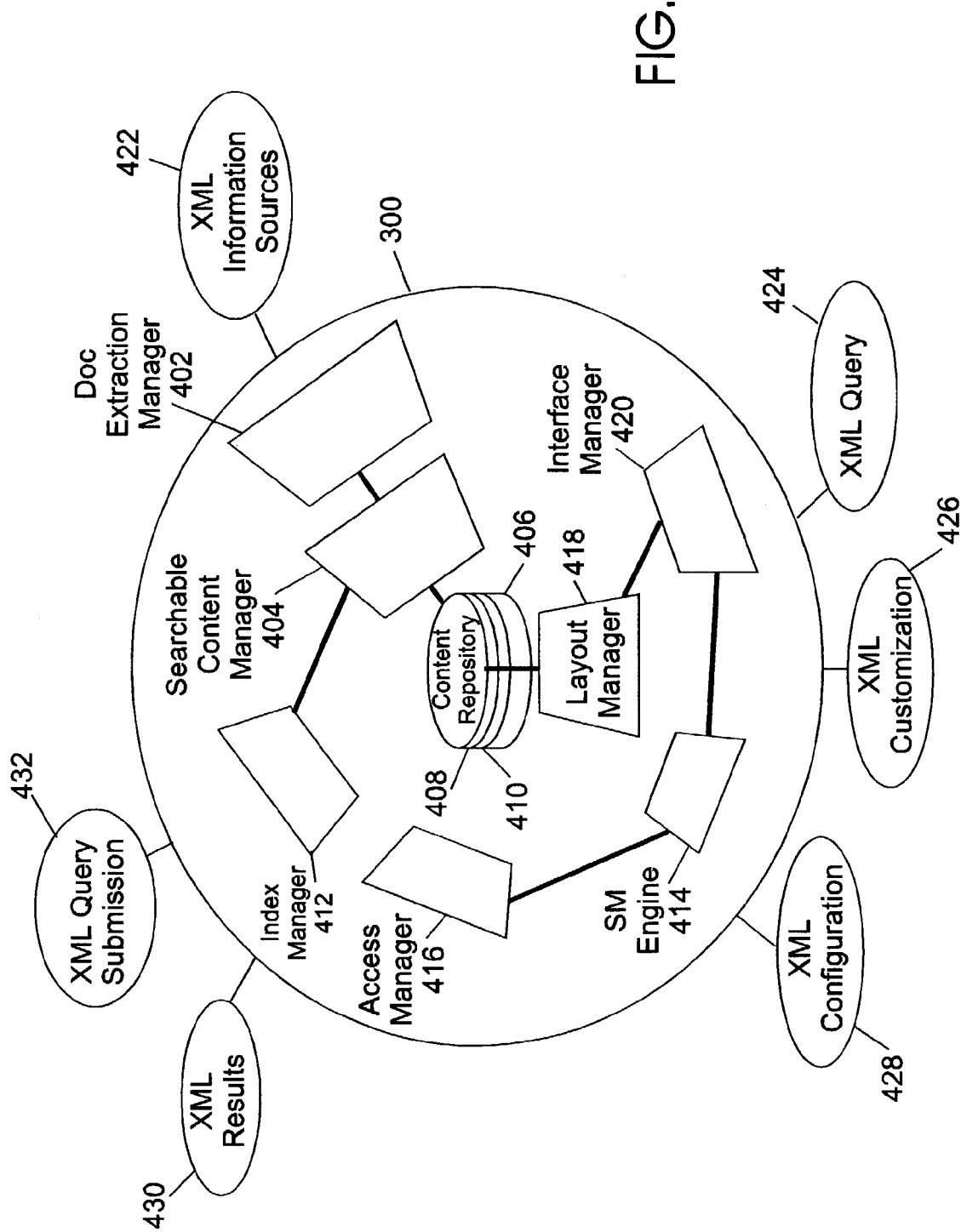
FIG. 4 is a schematic diagram showing details of the kernel of the present invention.

As shown in FIG. 4, the arrangement allows the kernel 300 to contain a minimum number of elements. Those elements are:

The Document Extraction Manager 402 which is responsible for "crawling" the original information sources and extracting the data and document content using a mechanism compatible with the information source that places the data in a format that can be processed by the Searchable Content Manager 404. U.S. patent application Ser. No. 10/157,243 filed on May 30, 2002 contains a description of the Document Extraction Manager.

Figure 8B:
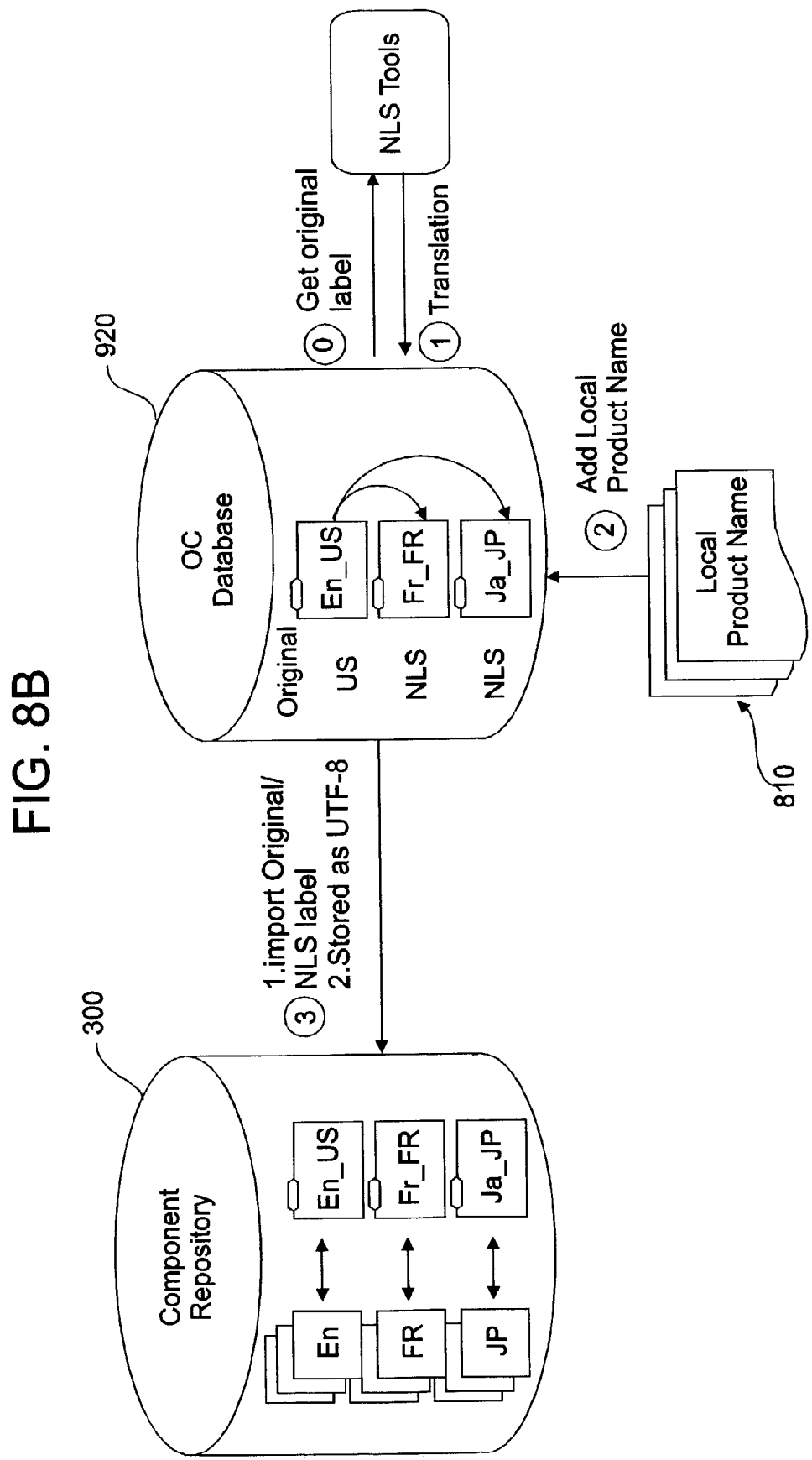
FIG. 8B is a process diagram showing the adding of local product names to the universal taxonomy database product types.

The Searchable Content Manager 404 which is responsible for processing the data extracted from the information sources and storing it in the Content Repository 406. The data is stored in the standard kernel format which is preferably based on granular elements or component objects of the documents. These elements can later be combined to compose coherent documents. A description of process can be found in U.S. patent application Ser. No. 10/159,373 filed on Jun. 30, 2002. As shown in FIG. 8A, the elements 800 are stored in the Content Repository 406 in taxonomy trees based on product types. For instance, for a computer oriented business there are software product types 802, and hardware product types 804 arranged in increasing levels identifying product types more specifically. FIG. 8B is a process diagram showing the process of local product names on the universal taxonomy database where names of products in multiple countries are contained. As shown in FIG. 8B, the local country product names 810 are added to the component repository 300 by a universal offering classification (OC) or taxonomy database 920 by using an add command. The folders en-US etc. contain the offering information provided from the product name database by a natural language support tool which adds product name translations from local country databases.

Having the taxonomy information attached to the document segments makes it possible to combine keyword searches with product identification information to narrow down search results.

Figure 9:
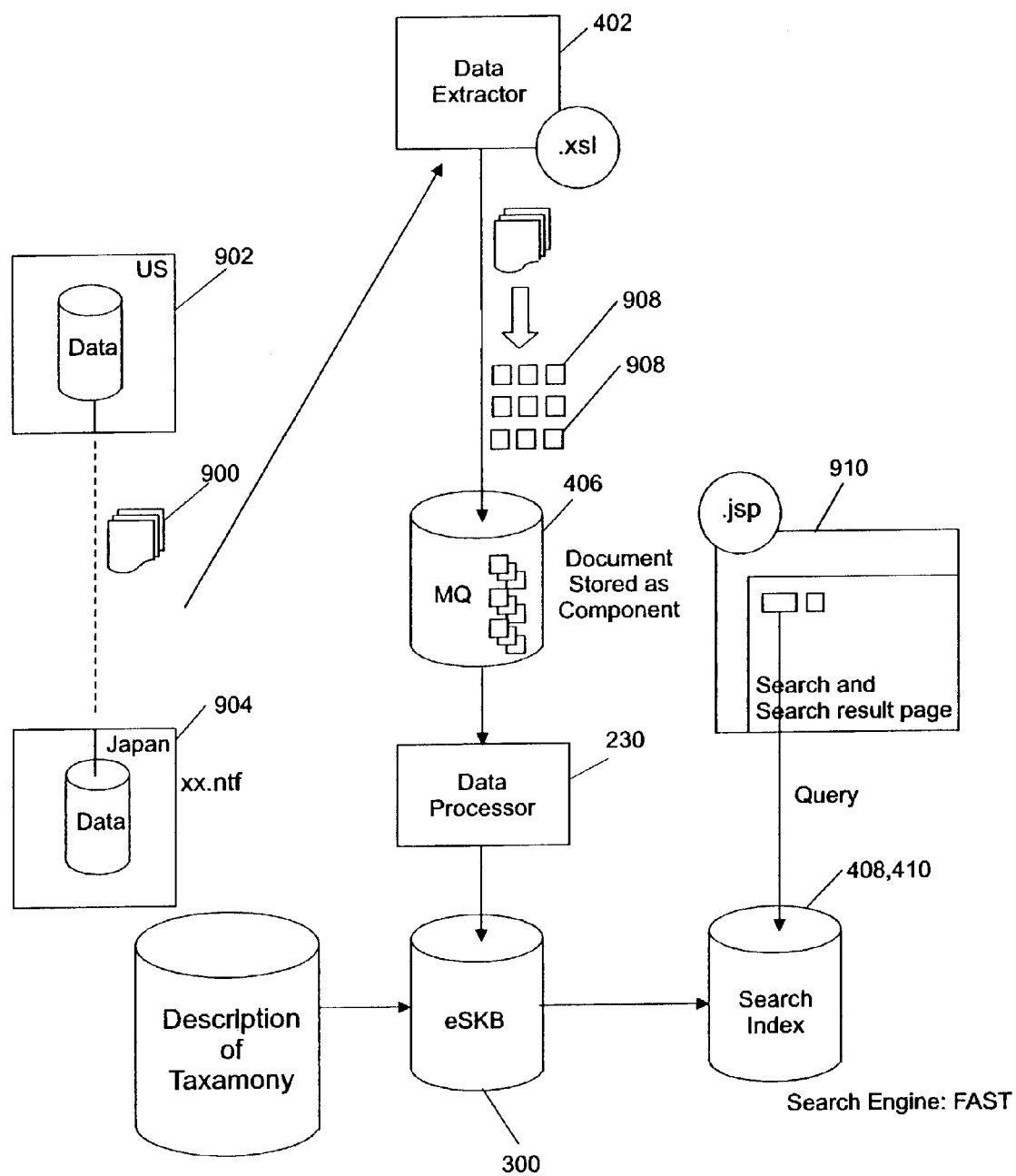
FIG. 9 is a schematic diagram showing storage and retrieval of documents using local (Japanese) database.

The Content Repository 406 which is a searchable library of elements 800 where the searchable contents are stored. As shown in FIG. 9, a document 900 available in various languages 902 to 904 is extracted by the data extractor 402 and reduced to segments or component objects 908 and stored in the kernel storage system or content repository. The objects 908 retain the natural language status of the documents in the kernel storage repository 406 but are changed to characters of the universal character set and are stored in the XML computer language by the data processor 230.

The repository 406 has a search index 408 to provide a mechanism to request a specific document on a user's computer screen 910 with a given set of attributes such as document view, document type, meta data, etc. Documents are stored in all available, supported natural languages NL in the content repository. The index contains an inverted index table 410 of U.S. patent application Ser. No. 10/180,195, filed on Jun. 27, 2002 and U.S. patent application Ser. No. 10/066,346 filed on Feb. 1, 2002, to allow selection of the documents in appropriate languages.

A more detailed view of the extended index table 410 of FIGS. 4 and 9 are shown in FIG. 10. English keywords K1 to Kn are extracted from the documents D1 to Dn. The corresponding keywords in all supported national languages are obtained so that for each English keyword Ki there is a synonymous keyword for every supported language. As shown in FIG. 10, an X indicates documents D1 to Dn in which the one or more of the listed keywords appear. Thus, as shown, the keyword K1 appears in documents D1 and Dj in English and keywords K11 and K12 with a synonymous meaning are in documents national languages NL1 and NL2. Similarly, synonymous keywords Ki1 and Ki2 are in document D2 which is available in national languages NL1 and 2 but not available in English. Synonymous keywords Kn and Kn2 are in document Dj which is available in English and national language NL2 but not available in national language NL1. Stored in each location marked with an X is ranking factor information such as: the number of times the word appears in the document, its proximity to other keywords appearing in the document; the type of document containing the keyword (i.e., a technical magazine or an advertisement), etc. This information is then used to rank each document relative to the other documents turned up by the search.

FIG. 9 shows the data retrieval process and store local document in a component format. The data from the local country database 904 is copied to the system database 902. The data extractor 402 retrieves the data from the system data base 902 in xml format and componentrized 908 and stores it to the component library 300 by using data processor 230. The data processor 230 stores the components against the local product names using the database 920. The components are ready to present for search by queries entered on the user's display screen 910.

When the table of FIG. 10 is interrogated by the keywords in any supported language, the documents in any language containing keywords with synonymous meanings to the keywords in the query are identified and provided with their ranking information. For instance, assume the query contains keywords Ki and Kn documents D2 to Dj and Dn would be identified in their available languages. Thus in the case of document D2, the document would be identified as being available in English and national language NL1 and NL2 while documents Dj would be available in national languages NL1 and NL2. Along with identifying of the documents either by title or filing number, the stored ranking factor information would be provided to the document ranking algorithm such as the one shown in copending U.S. patent application Ser. No. 10/120,071 filed on Apr. 10, 2002 and incorporated herein by reference.

Figure 11:
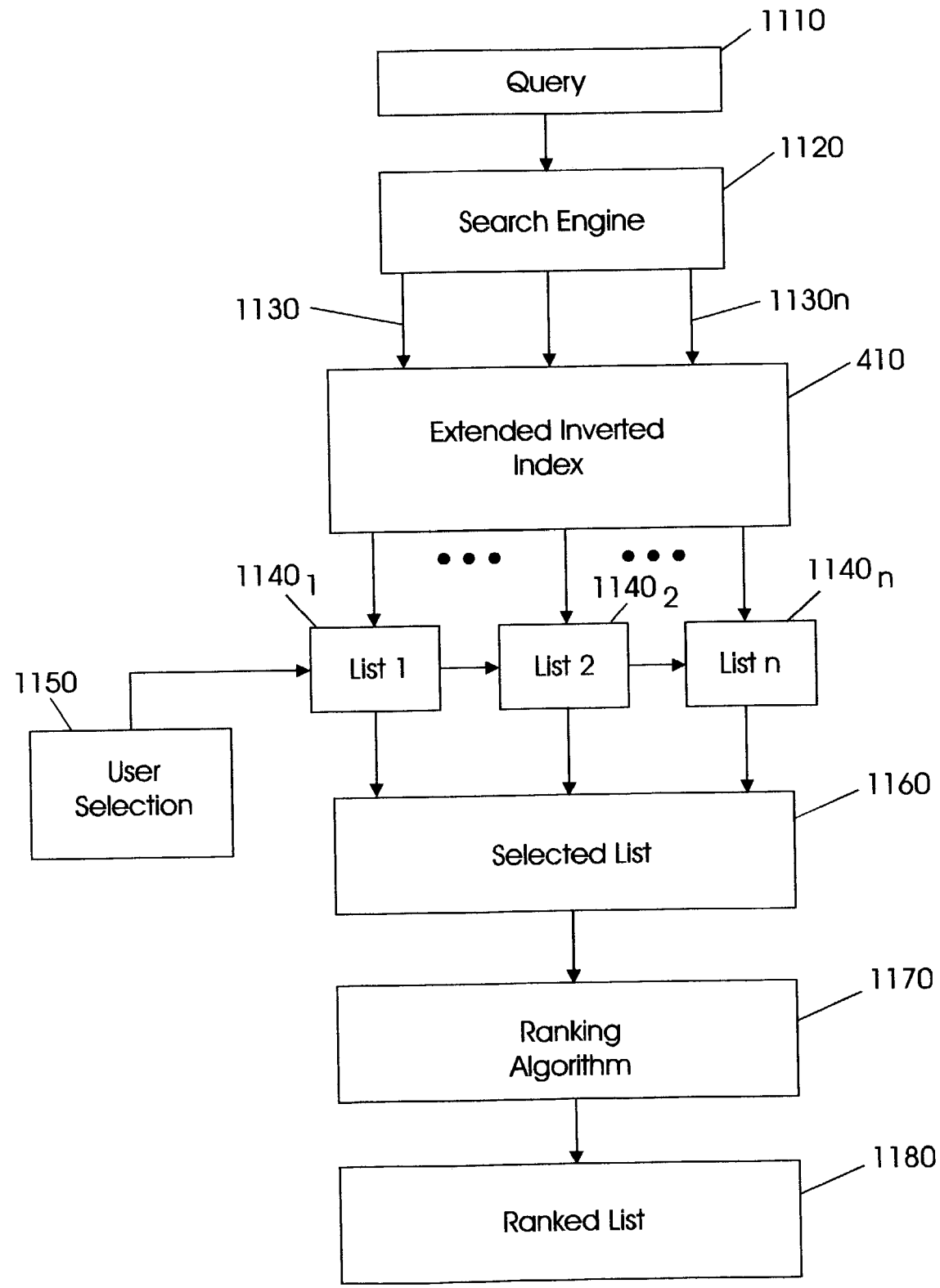
FIG. 11 is a diagram of a multi-language database search system.

FIG. 11 illustrates a search system incorporating the present invention. A query 1110 in any supported language is inputted to a search engine 1120 and passed to an extended keyword inverted index 410 described in connection with FIGS. 4 and 9. The index 410 supports a plurality of languages and allows translation of a keyword query in any supported language. In the case of an English language query, the query is applied to the inverted index 410 using the listings in language keywords $1130_1$ and the keywords $1130_2$ and $1130n$ in other supported languages. This generates an English-language hit list $1140_1$ to $1140n$ in any language of interest to the user. It is possible that the user will select one list (say list $1140_2$), determine that is inappropriate and try another selection. If the user has limited capabilities in understanding English, he may prefer to look at the results in any other national languages $1140_2$ to $1140n$. If the national language results (say $1140_i$) are not sufficient (or nonexistent), the user may go on to the English language results $1140_1$. In the alternative, the user may recognize that the results of interest are most likely to be the English results $1140_1$ and may start with those results. In another alternative, the user finds so many results in English that he decides to review the more selective list in his national language 1150. Where national language results are skimpy or unavailable, the search engine will provide documents in other languages to increase search results listed in the selected list 1160 with English being the default listing language with documents unavailable in English provided in languages which they are available. The documents in the selected list are analyzed by the ranking algorithm 1170 to provide a ranked list 1180 to the user.

As shown in FIG. 12, the computer screen for interrogating the present system would include spaces to enter the keyword query 1200. Search area 1202 is for indicating the scope of the search. Search area 1204 is to specify the languages to be searched. Area 1206 is to indicate the language in which the query terms are provided, and space 1208 is used to provide the language in which the ranking list is to be provided. Thus in the figure "laptop" and "IBM" are keywords to be examined. The search area is "any country". However if desired, the search could be restricted say to particular countries or even to particular document repositories. For instance, search area could be limited to the Library of Congress or to any library in the United States. Languages in which the search is to be performed is listed as all. This would result in a search in all supported languages so that the multiple copies of the same documents would be read out of the table. Space 1206 identifies the fact that the search words are in English. However, any other of the supported languages can be used. For instance if German is a supported language, the search terms 1200 could be German words and the query language would indicate that they are German. Finally, the results can be provided in a language that is different from the query language so that as shown here, though the search terms are English, the ranked documents would be provided in German to the extent that those documents are available in German. If any document was not available in German, the listing would contain that document in a language which it is available with English as the first default language. The use of the described spaces 1200 to 1208 permits control over its scope and languages in which the search is performed and the results delivered.

Figure 13:
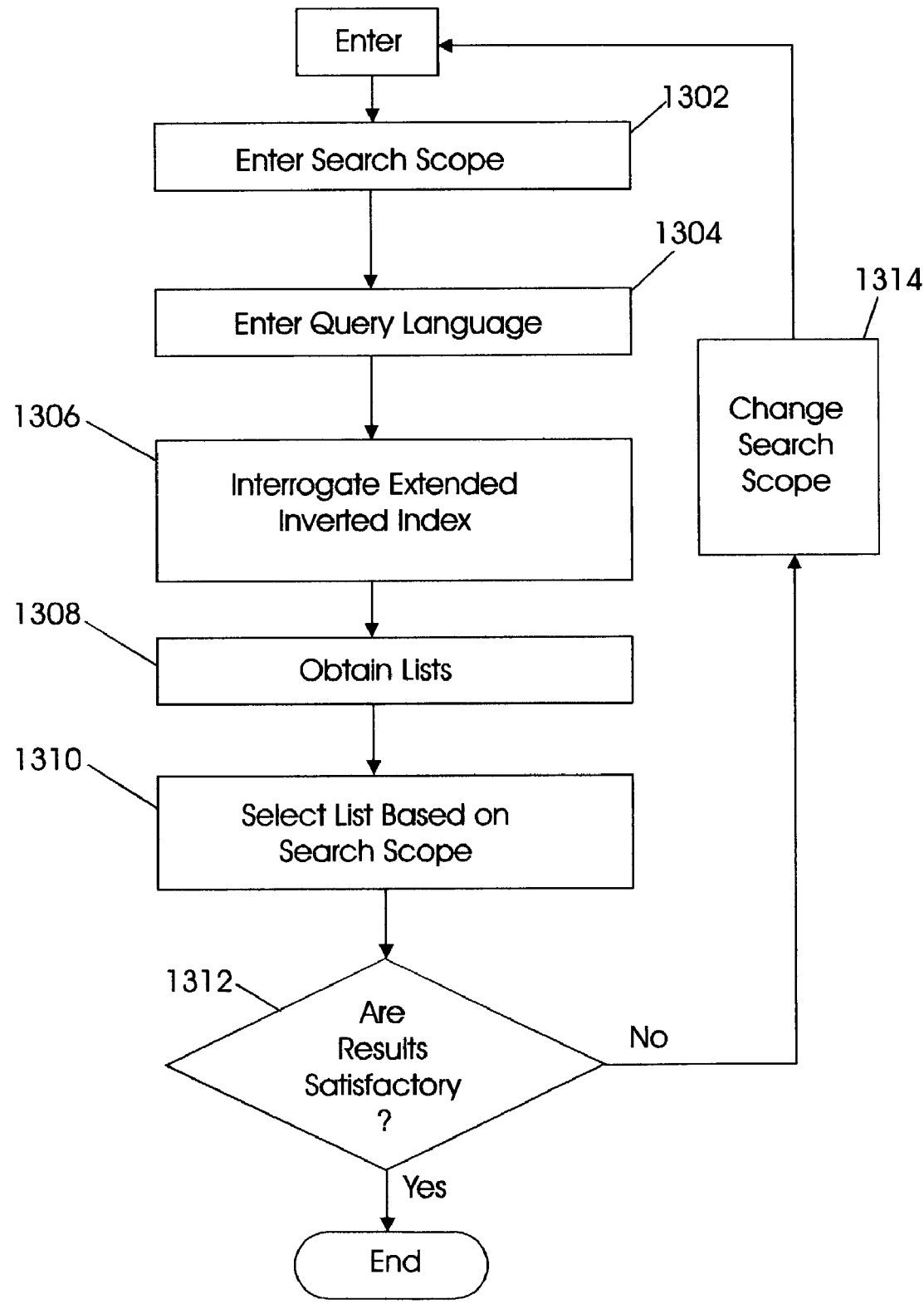
FIG. 13 is a flow chart for obtaining search results.

Referring now to FIG. 13, the system is interrogated by a user entering in steps 1302 and 1304 the search information set forth in spaces 1200 to 1208 in FIG. 12. The entered query and other information is then used to interrogate the extended inverted index table in step 1206 and a document list is obtained from the table 410. The search is then provided with the list of ranked documents in the language he prefers in step 1310 and decides in step 1312 whether the results are satisfactory. If they are, the process ends. However if the search is unsatisfied, he may extend or otherwise change the scope of his search in step 1314 by modifying the data provided in steps 1302 and 1304.

Referring back to FIG. 4, the Index Manager 412 which is responsible for building and updating the search index 408 by using the appropriate interfaces provided by the search engines, and based on the content stored in the Content Repository. The index manager can handle multiple search indices.

The Search Management Engine 414 which is primarily responsible for collecting the input parameters for the search query from the Interface Manager component and building a final query object using the configuration information (e.g., search engine parameters), personalization information (e.g., preferred document type), and taxonomy information (e.g., search categories). U.S. patent application, (YOR9-2002-0163), filed on Jul. 23, 2002, contains a description of the Search Management Engine.

The Access Manager 416 which is the direct interface to the search engine(s). It is responsible for submitting the search queries to the search engine(s) in the adequate format, and collecting the search results to be processed and returned to the user by other components. This can be achieved by using a generic adapter interface facing the internal components, and pluggable adapters facing the different search engines, U.S. patent application Ser. No. 10/209,619, filed on Jul. 31, 2002, and U.S. patent application Ser. No. 10/759,373 filed on Jun. 3, 2002, contains a description of the access manager.

The Layout Manager 418 which is responsible for building and customizing the layout of document content and search results. The content is retrieved from the Content Repository module 406. The Layout Manager is described in U.S. patent application Ser. No. 10/159,373, filed on Jun. 3, 2002 contains a description of the Layout Manager.

The Interface Manager 420 which is responsible for handling the GUI for the user and interfacing with the back-end modules. The inputs and outputs 422, 424, 426, 428, 430 and 432 to the kernel are the outputs and inputs of the translation stages 310 interfacing with the kernel 300, respectively.

Referring now to FIG. 5, documents and other data are extracted from the sources both on the intra and internets by a back-end process of continuously extracting, storing and indexing the data. The document extraction manager 402 goes out to the data sources through the translators 308 and 310 to each of the sources to provide a compatible request to the information source (steps 500 and 502). It extracts the data from the source, converts it to XML form in translators 308 and 310 and places the data in the content repository 406 (steps 504, 506 and 510). The index manager 412 generates index data for the extracted document and places it in the content repository along with the data (step 512). All supported national languages NL of the document are extracted and stored in the repository and are accessible using the inverted index 410.

Figure 14:
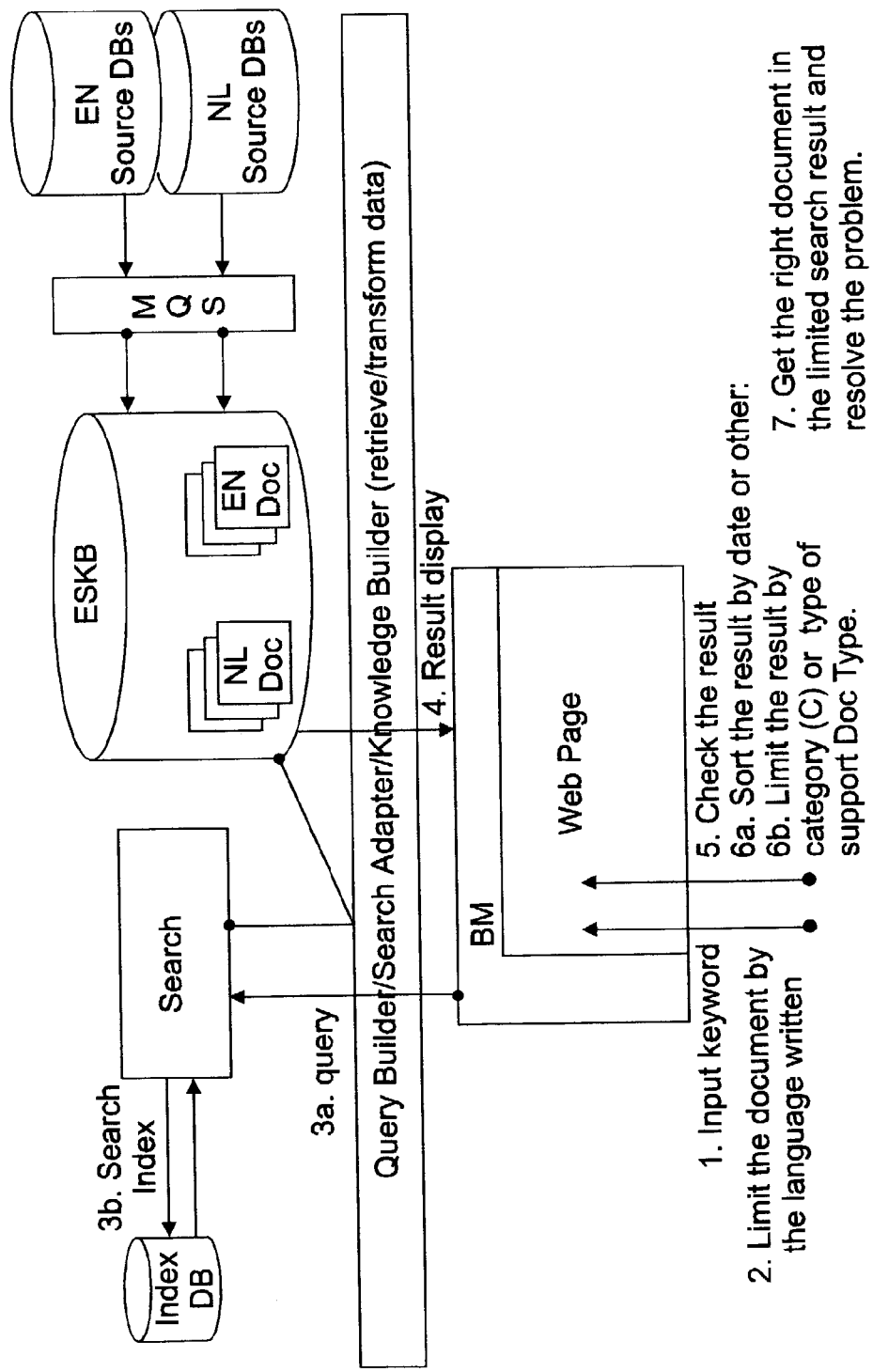
FIG. 14 is a block diagram of the international search process.

Referring now to FIGS. 6 and 14, upon the receipt of a query in the HTTP language (step 600), the translators 308 and 310 translate the query to the kernel XML form (step 602). The interface manager formulates the query for accessing the content repository 406 (step 604) and provides the query to the Search Management engine 414 (steps 606 and 608) which obtains customization and configuration data and adds it to that of the query. The customization data personalizes the query to that of the user while the configuration data identifies the source of the particular internet or interanet server providing the data. The access manager 416 generates a hit list for the information (step 610) and provides it to the interface manager 420 which changes it to the GUI of the user transmits it to the translators 308 and 310 to convert it to the language of the users interface (step 612).

Figure 7:
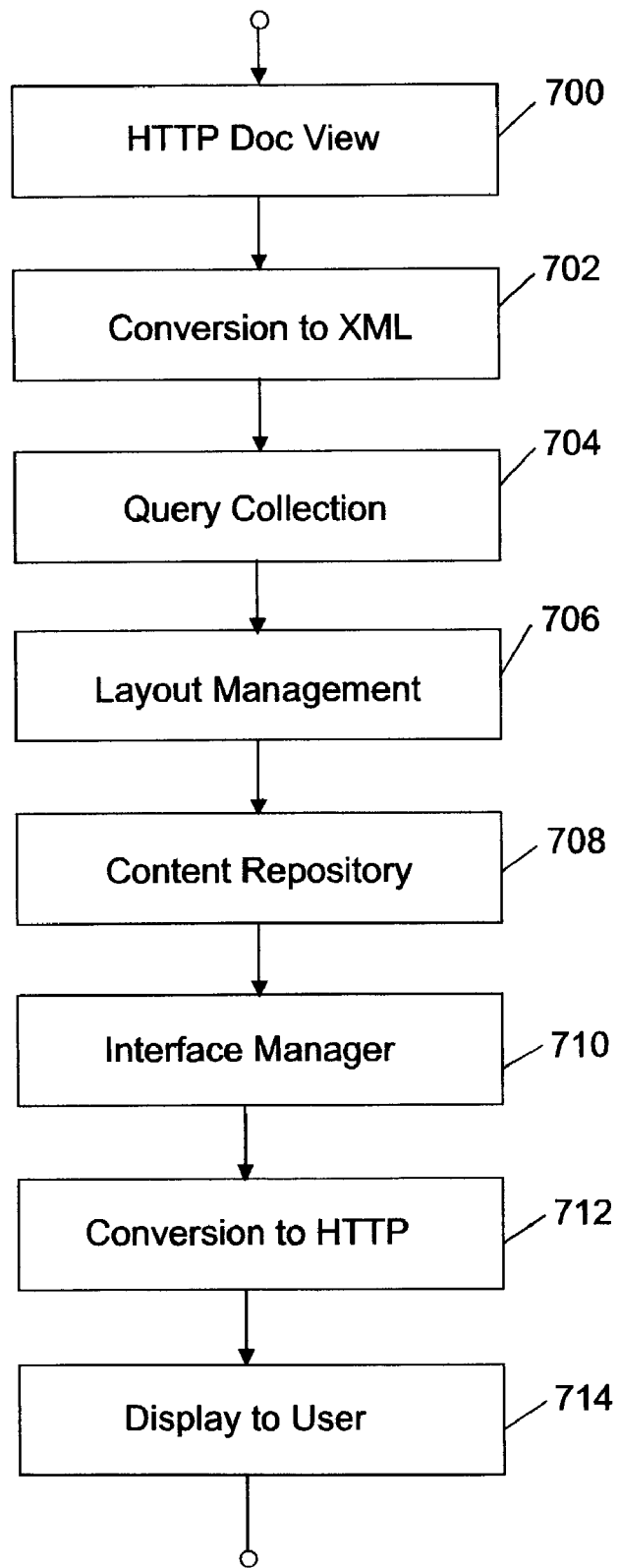
FIG. 7 is a schematic diagram of the handling of document request query in accordance with the present invention.

Referring now to FIG. 7, when a user views the hit list and requests the data with an HTTP document view query (step 700) the data is converted to an XML query (step 702) and fed to the interface manager 302 for query collection (step 704). The information from the interface manager is fed to the layout manager 418 which generates documents from the contents of the content repository 314 (steps 706 and 708) and transmits the document to the user through the interface manager 420 and translators 308 and 310 to convert the XML documents to the HTTP form (steps 710 and 712) and provides them to the user display (step 714).

Figure 15:
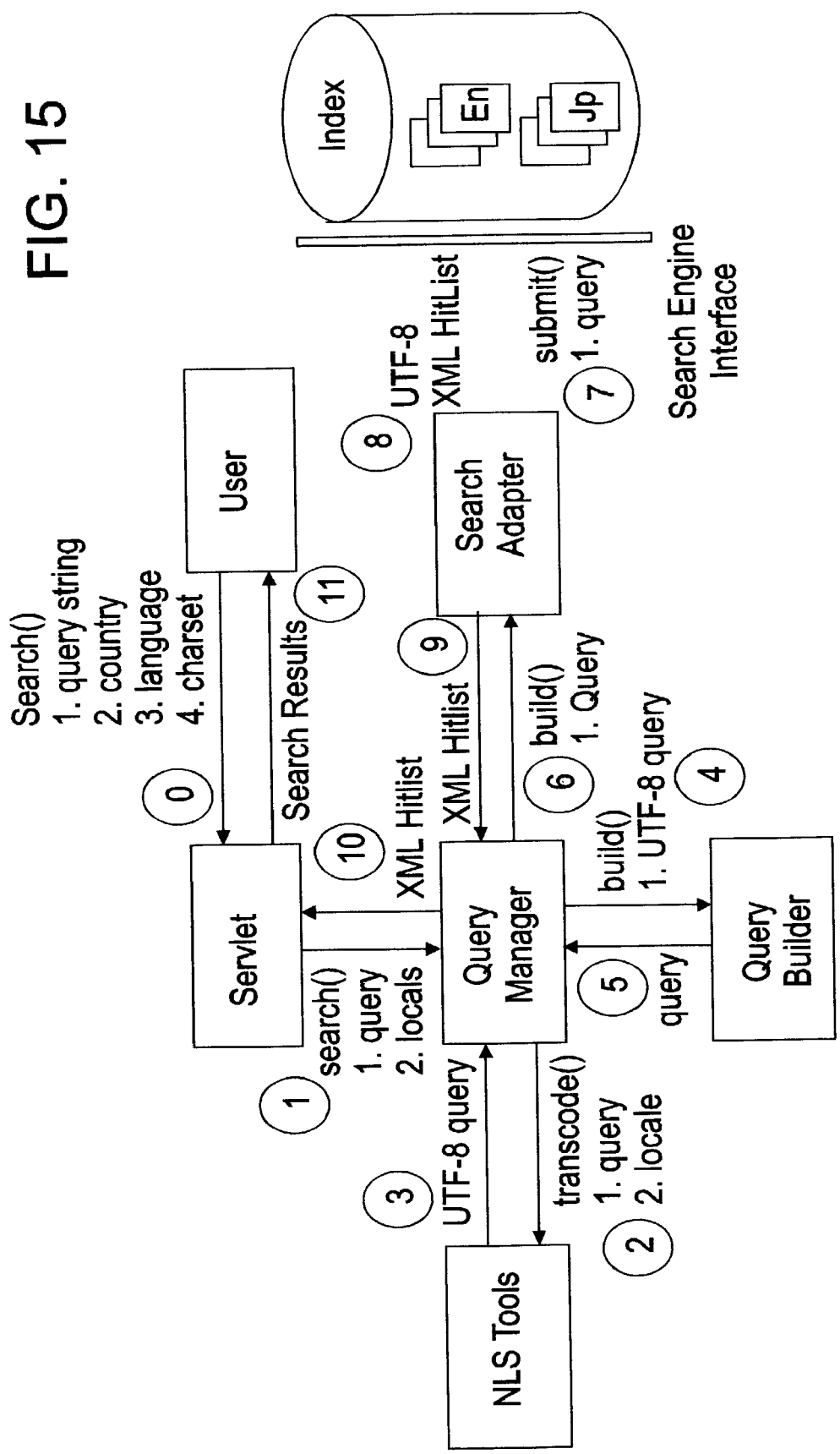
FIG. 15 is a flow diagram showing the sequence of a search through the elements of the kernel.

FIG. 15 shows the sequence of events during searching in the various components of the system.

Above we have described one embodiment of the invention and modifications of this embodiment may be apparent to those skilled in the art. For instance as pointed out, different languages are easily accommodated by addition of another layer to the translators while entirely different languages can be added by adding an additional segment to access the kernel. Further while XML has been used as the kernel of the languages, other languages, such as GML, html, can be used in place of XML. In addition, the translators are described as translating between XML and HTTP, html, and other connectors can be used. For this reason it should be understood that the present invention is not limited to the described embodiment but includes all changes that fall within the spirit and scope of the appended claims.

What is claimed is:

1. A search engine management system for searching for information about offered products on documents in multiple natural languages, the system comprising:
  a format translational layer that receives a document concerning an offered product using a local name in a local natural language where information about the product is contained in a document in at least one more of the multiple natural languages, the document having an input format and input data, the format translational layer retaining the data in its local natural language, converting the input format to a single kernel format with a translation of the local product name added to the document in the at least one more natural language, the translational layer further having one or more output adaptors; and
  a kernel layer using the kernel format to operate on the input data with one or more kernel elements to produce kernel results whereby the kernel results are sent to one or more of the network outputs through the translational layer where the output adaptors convert the kernel results to the output format in one more of the multiple natural languages.

2. A system as in claim 1, where the kernel format includes any one or more of the following formats: XML, GML, and html, in Unicode character sets.

3. A system of the type claimed in claim 1 including:
  a list of keywords in the kernel layer which includes, for each of a plurality of documents in a database of the kernel layer, keywords with synonymous meanings of the multiple natural languages;
  an inverted index in the kernel layer for the plurality of documents of the database including the keywords with synonymous meanings in the list; and
  a search engine in the kernel layer responsive to keywords in both the retained natural language and the at least one more natural language, said search engine using the inverted index to obtain a set of results which include the documents which correspond to input keyword search terms in the the at least one more natural language and which documents are in the retained local natural language.

4. A system of the type described in claim 3, wherein the list is a two-way list which is usable in converting a search term from a first natural language to a second natural language and from a second natural language to a first natural language.

5. A searching system of the type described in claim 4, wherein the converting of search terms uses Unicode character sets for managing the multiple natural languages.

6. The search engine management system of claim 1 including a database in the kernel layer where the product offering documents are stored in segments identified by keywords to form a product taxonomy tree.

7. A computer program product on a computer usable system for a search engine management system for searching for information about offered products in documents in multiple natural languages, comprising:
  software for a format translational layer that receives a document using a local product name in a local natural language for a product that is described in a document in at least one more of the natural languages, the document having an input format and input data, the format translational layer retaining data in its local natural language but converting the input format to a single kernel format with a translation of the local product name added to the document in the at least one more natural language, the translational layer further having one or more output adaptors; and software for a kernel layer using the kernel format to operate on the input data with one or more kernel elements to produce kernel results whereby the kernel results are sent to one or more of the network outputs through the translational layer where the output adaptors convert the kernel results to the output format in a selected natural language.

8. A computer program product as in claim 7, where the kernel format includes any one or more of the following formats: XML, GML, and html, in Unicode.

9. A computer program product as in claim 8, wherein the converting of search terms uses the Unicode system for managing multiple languages.

10. A computer program product as in claim 7, where the kernel elements include content repository and any one or more of the following:

Content Extraction Manager; Searchable Content Manager; Access Manager; Index Manager; Interface Manager; Layout Manager; and Search Management Engine.

11. A computer program product of claim 7, comprising:

software for a list of keywords which includes, for each of a plurality of documents in a database in the kernel layer, keywords with synonymous meanings in the multiple natural languages;

software for an inverted index for the plurality of documents of the database including the keywords with synonymous meaning in the list; and a search engine responsive to keywords in both the multiple languages, said search engine using the inverted index to obtain a set of results which include the documents which correspond to input keyword search terms in the local natural language and which includes documents which are in the at least one more natural language.

12. A computer program product as in claim 11, wherein the list is a two-way list which is usable in converting a search term from a first natural language to a second natural language and from a second natural language to a first natural language.

13. A computer program product as in claim 7 including software for a universal taxonomy database containing product names in a plurality of natural languages.

14. The computer program product of claim 13 including software for dividing the documents into segments forming a taxonomy tree where the segments are identified by keywords.

15. A computer program product of claim 7 including the software for storing located documents in a component format database system.

* * * * *